Dec. 19, 1961    T. G. AMBROSIO ET AL    3,013,592
TILTING TABLE SAW

Filed March 23, 1959    3 Sheets-Sheet 1

*INVENTORS*
EUGENE J. MEYERS
THEODORE G. AMBROSIO
BY

*John A. Duffy*
AGENT

Dec. 19, 1961  T. G. AMBROSIO ET AL  3,013,592
TILTING TABLE SAW

Filed March 23, 1959  3 Sheets-Sheet 2

INVENTORS
EUGENE J. MEYERS
THEODORE G. AMBROSIO
BY
John A. Duffy
AGENT

Dec. 19, 1961  T. G. AMBROSIO ET AL  3,013,592
TILTING TABLE SAW

Filed March 23, 1959  3 Sheets-Sheet 3

INVENTORS.
EUGENE J. MEYERS
THEODORE G. AMBROSIO
BY
*John A Duffy*
AGENT

United States Patent Office 3,013,592
Patented Dec. 19, 1961

3,013,592
TILTING TABLE SAW
Theodore G. Ambrosio, 706 Broadman St., and Eugene J. Meyers, 8862 Lola Ave., both of Anaheim, Calif.
Filed Mar. 23, 1959, Ser. No. 801,044
2 Claims. (Cl. 143—36)

This invention relates to table saws and more particularly to a tilting table saw having new and improved means for varying the angular position of the saw blade relative to the work-supportable table.

Saw machines having means for varying the angle between the saw blade and the horizontal work-supporting table are well-known. One common type adjusts the angle between the blade and the table by moving the table horizontally. Such a device employs complicated mechanisms with precision components which results in excessive costs of manufacture and maintenance. Another well-known type provides trunnions for supporting the saw blade as it is tilted in a circular arc. Again, to realize an efficient and accurate machine, precision parts and expensive supporting mechanisms are necessary.

The saw machine of this invention overcomes the above stated disadvantages by providing a simple and accurate mechanism for adjusting the blade which requires no precision machined components. Utilizing cheap easily manufactured parts a versatile table saw is provided which produces many additional advantages over saws known in the art.

It is therefore an object of this invention to provide a versatile table saw with simple and accurate operating characteristics.

It is another object of this invention to provide a table saw having new and improved means for adjusting the saw blade.

It is still another object of this invention to provide a table saw with improved means for tilting the saw blade with respect to the work-supporting table.

It is a further object of this invention to provide a table saw with improved means for vertically adjusting the saw blade with respect to the work-supporting table.

It is a still further object of this invention to provide a table saw having spring means for aiding the tilting of the saw blade.

It is another object of this invention to provide a table saw having means for quick tilting of the saw blade.

These and other objects and advantages of the present invention will become apparent from the following detailed description of a preferred embodiment thereof, when taken in conjunction with the appended drawings wherein.

Figure 4:
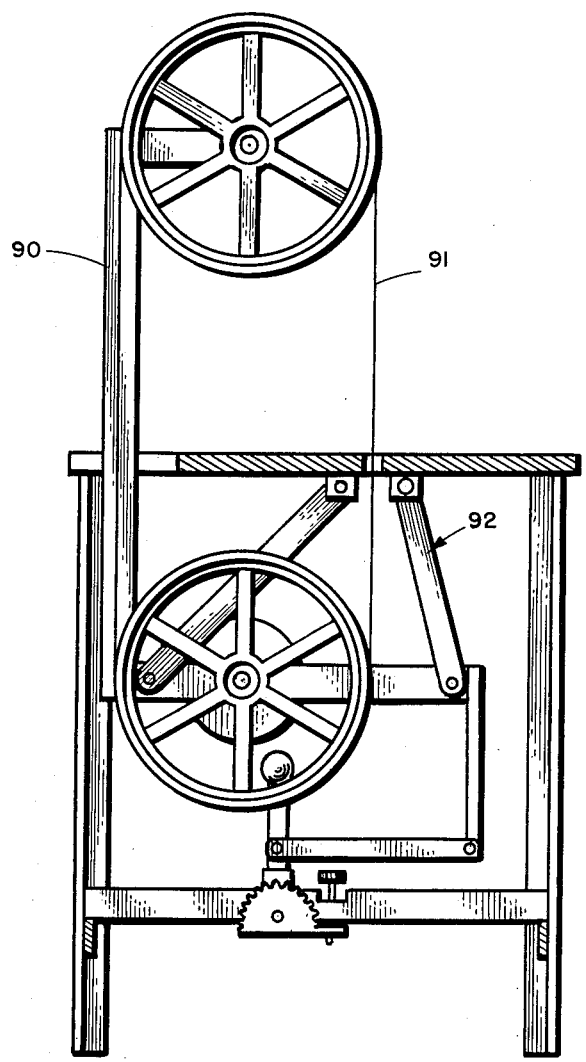

And FIG. 4 shows an embodiment of the device illustrating the application of the tilting mechanism to a band saw.

Figure 1:
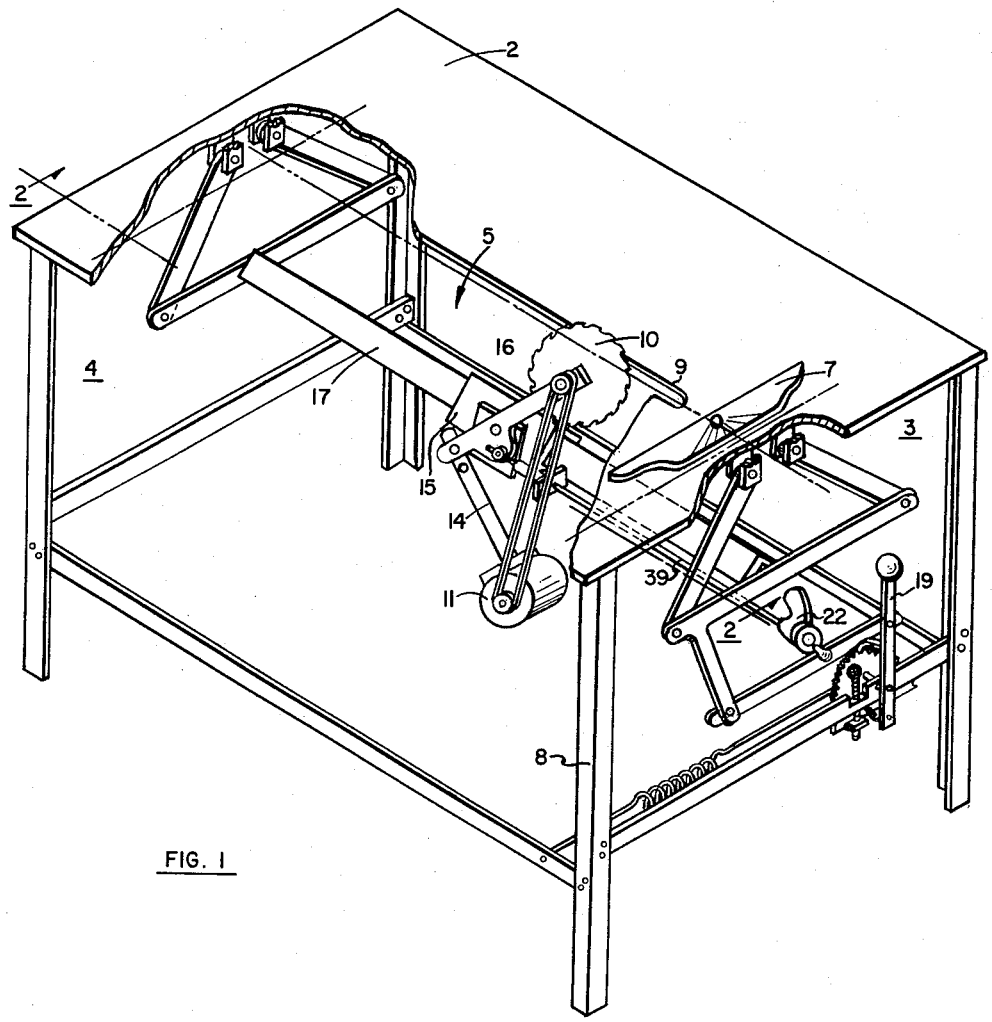
FIG. 1 is a view in perspective of a preferred form of the table saw of this invention.

Referring to the drawings and more particularly to the perspective view of FIG. 1, the preferred form of the table saw of this invention includes a fixed base 1 with a horizontal work-supporting table 2 fixed thereto by suitable means. Base 1 may comprise, for example, vertical front, rear, and side walls 3, 4, 5, and 6, respectively, having their upper ends fixedly secured to table 2. Walls 3, 4, 5, and 6 may be secured to angle frame means 8 for additional stability. Table 2 has formed thereon an elongated slot 9 (shown partly cut away) which receives the saw blade 10. A suitable angular setting device or guide 7 on table 2 is provided for the initial setting of a workpiece.

Motor means 11 is integrally supported with blade 10 by frame means 14. Frame means 14 is rigidly attached to guide means 15 which includes a suitable complementary slide and track means well-known in the art with track means 16 attached to frame means 14 and slidably disposed in slide means 17 to guide frame means 14 along a horizontal axis of travel whereby blade 10 moves horizontally in slot 9 with respect to table 2. Slide means 17 is supported at its ends by means to be more fully described later adjustably interconnecting base 1 and guide means 15 whereby blade 10 may be tilted relative to table 2 while its point of intersection with the table remains substantially fixed relative to base 1. Blade 10 may also be adjusted vertically with respect to table 2 by means, to be more fully described later, of an L-shaped mechanism tilting about frame means 14. Thus, the rotating of suitable control means 22 attached to a shaft 39 causes movement of the members of frame means 14 which in turn moves blade 10 vertically with respect to table 2. Likewise pushing control means 22 in or pulling out causes blade 10 to move horizontally in slot 9 with respect to table 2. Tilt control means 19 tilts blade 10 with respect to table 2.

Figure 2:
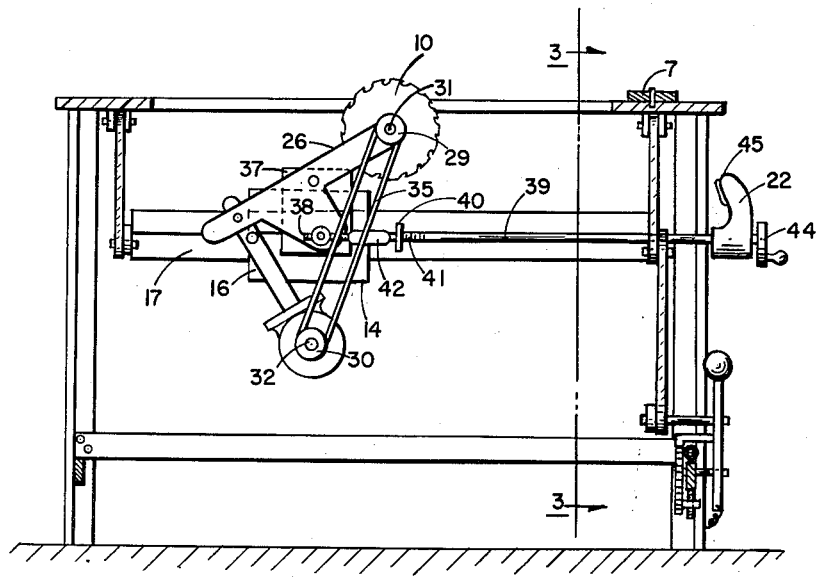
FIG. 2 is a side elevation view taken partly in vertical section of the device of FIG. 1.

Referring now to FIG. 2 there is shown a side elevation view of the saw machine of FIG. 1 and illustrating in particular the structure for the horizontal and vertical adjustment of blade 10 with respect to table 2. Frame means 14 includes an L frame comprising upper member 26 and lower member 28 integrally connected. Spaced upper and lower pulleys 29 and 30, respectively, are rotatably supported in a common plane by shafts 31 and 32. An electric motor of motor means 11 is secured to member 28 for effecting rotation of the lower pulley 30 by suitable means (not shown). Flexible belt 35 joins pulleys 29 and 30. The upper end of member 26 contains shaft 31 suitably journalled for rotation. Saw blade 10 is attached to shaft 31 for rotation. Upper member 26 is joined to track means 16 at pivot point 29 which may be any suitable pivot structure. Extending out from and rigidly attached to member 26 is a first flange 37. Flange 37 is journalled at its end to receive shaft 38. Shaft 38 is attached to pivot in flange 37 but prevented from moving horizontally by suitable locking means (not shown). Shaft 39 extends through second flange 40 which has a threaded hole 41 adapted to receive shaft 39 which in turn is suitably threaded. Flange 40 has one portion rigidly attached to track means 16 and an L-shaped extension including threaded hole 41. Shaft 39 is joined to shaft 38 by means of universal joint 42. Universal 42 is connected to allow shaft 39 to rotate and also to move laterally with respect to shaft 38. Shaft 38 is prevented from rotating by universal 42. Control means 22 includes a suitable electrical switch 45 which may be, for example, in the form of a handle and a knob 44 for rotating shaft 39. Switch 45 is electrically wired (not shown) through shaft 39 to the electric motor of motor means 11 which receives operating and control electricity through switch 45. As knob 44 is turned shaft 39 turns in threaded hole 41 of flange 40 thereby causing members 26 and 28 to pivot about point 29 thus moving blade 10 vertically with respect to table 2. Horizontal movement of blade 10 may also be accomplished by pulling or pushing handle 22 which moves frame means 14 (rigidly attached to sliding means 16) along track means 17. Thus, it may readily be seen from FIG. 2 that a versatile and simple means is provided whereby blade 10 may be adjusted vertically and horizontally with respect to table 2. The exact location of pivot point 29 about which frame means 14 pivots during vertical adjustment of blade 10 is determined by the length of members 26 and 28 and may readily be constructed so as to effect a precision vertical movement of blade 10.

Figure 3:
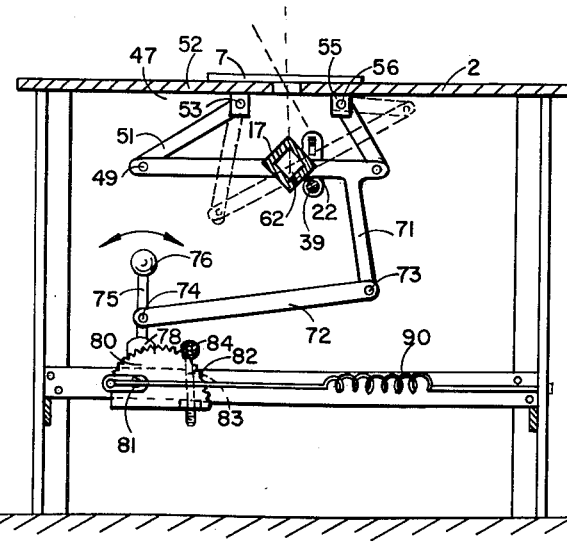
FIG. 3 is a front elevation view partly in section illustrating particularly the quick and fine tilting characteristics of the device.

Referring now to FIG. 3, a front elevation view partly in section of the preferred embodiment of this invention, there is illustrated more particularly the structure which produces the tilting of blade 10. In FIG. 3 blade 10 is tilted with respect to table 2 upon lateral movement of tilting knob 76 in the direction shown by the arrows. Track means 17 is supported at both ends by a pair of tilting mechanisms 46 and 47 with tilting mechanism 47 only shown in FIG. 3. Tilting mechanism 47 comprises a first bar 48 which rigidly holds track means 17. Bar 48 has a pair of pivot points 49 and 50 located at the ends thereof. A second bar 51 has one end joined to first bar 48 at pivot point 49 and the other end joined to flange 52 which extends down from and is rigidly attached to table 2. Bar 51 is joined to flange 52 at pivot point 53. A third bar 54 of tilting mechanism 47 has one end joined to bar 48 at pivot point 50 and the other end joined to pivot point 56 of flange 55. Flange 55 is rigidly attached to table 2. The location of pivot points 53 and 56 and the lengths of bars 48, 51 and 54 is determined by the below described method:

A first intersection point 61 defines the point of intersection of blade 10 with table 2. A line drawn from point 61 perpendicular to bar 48 intersects bar 48 at a second intersection point 62. Points 49 and 50 of bar 48 may be located at any predetermined distance from point 62 consistent with practical design limitations in the overall structure. Pivot point 53 is located at a point below table 2 near the centerline 61—62. Pivot point 56 opposite pivot 53 is located below table 2 on the other side of line 61—62. Pivot points 53 and 56 are located so that the pivot points 49 and 50 of bars 51 and 54 describe circular arcs as bar 48 is tilted. Pivot points 53, 56 may be constructed so as to be substantially coincident with pivot point 61. However, it has been found that better operating characteristics are achieved when pivot points 53 and 56 are placed a small distance on each side of pivot point 61. Location of pivot points 53 and 56 as described allows bar 48 to pivot in such a manner that the movement of intersecting point 62 described a circular arc whose radius is equal to the distance between 61 and 62 and bar 48 remains perpendicular to the radius line from 61 to 62 at all times. Thus, it is readily apparent that since the axis of blade 10 is coincident with the axis 61—62 movement of bar 48 tilts blade 10 with respect to table 2 about a single point of intersection 61.

Bar 48 is moved by a mechanism comprising linkages 71 and 72 pivoted at points 73 and 74, respectively. Pivot point 74 is located on a suitable bar 75 having knob 76 at its upper end. Thus, movement of knob 76 in either direction as shown by the arrows in FIG. 3 moves members 72 and 71 and in turn track means 17 and bar 48.

Tilting mechanism 47 may be quick tilted or precision tilted by the structure shown in FIGS. 1 and 3. The lower end of bar 75 is a semi-circular track 78 which is adapted to engage with track 80. Track 80 is attached to base 1. Track or gear 78 may be disengaged from track 80 allowing quick tilting by horizontal movement of knob 76. Precision tilting is accomplished when tracks 78 and 80 are engaged. Track 80, attached to base 1, is adapted to pivot about point 81 in base 1. Track 80 has an extended portion 82 which has a threaded eye 83 located therein. Threaded shaft 84 extends through eye 83 and has a knob 84 thereon. The turning of knob 84 causes track 80 to rotate about point 81 and thereby provides force tilting.

Spring 90 having one end attached to surface 5 of base 1 and the other to pivot point 81 provides an aiding force when knob 76 is actuated to tilt blade 10. For example, upon movement of knob 76 to the right spring 90 provides an aiding force tending to move tilting mechanism to the right.

The embodiment illustrated in FIG. 1 is shown as a preferred design. Many other adaptations of the adjustment structures are readily ascertained to one skilled in the art. For example, in FIG. 4 there is shown a band saw having a C-frame 90 supporting a flexible saw blade 91. C-frame 90 may be attached to tilting mechanisms 92 and 93 similar in construction to mechanisms 46 and 47 to provide for accurate tilting adjustment.

Although the invention has been described and illustrated in detail, it is to be clearly understood that the same is by way of illustration and example only and is not to be taken by way of limitation, the spirit and scope of this invention being limited only by the terms of the appended claims.

We claim:
1. A table saw comprising a base, a horizontal work-supporting table fixed to said base, a rotary saw blade associated with said saw and intersecting said table at a first intersection line, motor drive means connected to rotate said saw blade, frame means for integrally supporting said motor means, and means for tilting said frame means with respect to said table said tilting means including a first bar below and transverse of said intersection line and having said frame means mounted thereon, said first bar having an intermediate intersection point in a line radially extending from said first intersection line substantially in the plane of the sawblade, said first bar having first and second pivot points at its ends, a second bar having one end joined to said first bar at said first pivot point, a third bar having one end joined to said first bar at said second pivot point, the other ends of said second and third bars connected to pivot about third and fourth pivot points on said base and the axes of all said pivot points being parallel to said intersection line whereby said second intersection point describes a circular arc whose center is substantially coincident with said first intersection line when said frame means is tilted with respect to said base.

2. A table saw comprising a base, a horizontal work-supporting table fixed to said base, saw blade means associated with said saw and having a rotary blade intersecting said table at a first intersection line, and means for tilting said saw blade means with respect to said table comprising a first bar having one end joined to said table at a first pivot point, a second bar having one end joined to said table at a second pivot point, a third bar for supporting said blade means, said third bar having third and fourth pivot points respectively at opposite ends thereof, the axes of all said pivot points being parallel to said intersection line, the other end of said first bar joined to said third pivot point and the other end of said second bar joined to said fourth pivot point, and means for swinging said third bar about said intersection line whereby said blade is tilted relative to said table while said intersection line remains substantially fixed with respect to said base.

References Cited in the file of this patent
UNITED STATES PATENTS

| | | |
|---|---|---|
| 1,816,069 | Bennett | July 28, 1931 |
| 2,601,878 | Anderson | July 1, 1952 |
| 2,703,115 | Beagle | Mar. 1, 1955 |
| 2,811,994 | Dooley | Nov. 5, 1957 |